(12) United States Patent
Wohlgemuth

(10) Patent No.: US 9,291,514 B2
(45) Date of Patent: Mar. 22, 2016

(54) PRESSURE SENSOR HAVING A COMPRESSIBLE ELEMENT

(75) Inventor: Christian Wohlgemuth, Berlin (DE)

(73) Assignee: EPCOS AG, Munich (DE)

( * ) Notice: Subject to any disclaimer, the term of this patent is extended or adjusted under 35 U.S.C. 154(b) by 112 days.

(21) Appl. No.: 13/997,627

(22) PCT Filed: Dec. 22, 2011

(86) PCT No.: PCT/EP2011/073854
§ 371 (c)(1),
(2), (4) Date: Sep. 9, 2013

(87) PCT Pub. No.: WO2012/089625
PCT Pub. Date: Jul. 5, 2012

(65) Prior Publication Data
US 2013/0340532 A1 Dec. 26, 2013

(30) Foreign Application Priority Data
Dec. 27, 2010 (DE) .................... 10 2010 056 335

(51) Int. Cl.
*G01L 7/08* (2006.01)
*G01L 19/06* (2006.01)

(52) U.S. Cl.
CPC . *G01L 7/08* (2013.01); *G01L 19/06* (2013.01); *G01L 19/0618* (2013.01); *G01L 19/0645* (2013.01)

(58) Field of Classification Search
USPC .................................... 73/700–756
See application file for complete search history.

(56) References Cited

U.S. PATENT DOCUMENTS

| | | |
|---|---|---|
| 3,587,326 A | 6/1971 | Parker et al. |
| 3,967,504 A | 7/1976 | Akeley |
| 4,028,945 A | 6/1977 | Bergamini |
| 4,058,788 A | 11/1977 | Andrews et al. |
| 4,161,887 A | 7/1979 | Stone et al. |
| 4,218,925 A | 8/1980 | DiDomizio, Jr. |
| 4,398,194 A | 8/1983 | Johnston |
| 4,543,832 A | 10/1985 | Van Over |
| 4,640,135 A | 2/1987 | Kastel et al. |
| 4,668,889 A * | 5/1987 | Adams .......................... 310/338 |
| 4,691,573 A | 9/1987 | Varnum et al. |
| 4,833,920 A | 5/1989 | Knecht et al. |
| 4,884,451 A | 12/1989 | Schulze |
| 5,179,861 A | 1/1993 | Asano et al. |
| 5,184,107 A | 2/1993 | Maurer |
| 5,212,989 A | 5/1993 | Kodama et al. |
| 5,307,684 A | 5/1994 | Moss et al. |
| 5,483,994 A | 1/1996 | Maurer |
| 5,792,958 A | 8/1998 | Speldrich |
| 5,892,156 A | 4/1999 | Kathan et al. |

(Continued)

FOREIGN PATENT DOCUMENTS

| | | |
|---|---|---|
| DE | 10023589 A1 | 11/2001 |
| DE | 102007060184 A1 | 6/2008 |

(Continued)

*Primary Examiner* — Andre Allen
(74) *Attorney, Agent, or Firm* — McDermott Will & Emery LLP

(57) ABSTRACT

The invention relates to a pressure sensor (1, 41) comprising a chamber (3) in which a sensor element (4) for measuring pressure is arranged. The pressure sensor (1, 41) further comprises a compressible element (6, 7) for overpressure protection, said compressible element (6, 7) being arranged outside the chamber (3).

17 Claims, 3 Drawing Sheets

(56) References Cited

U.S. PATENT DOCUMENTS

Figure 3:
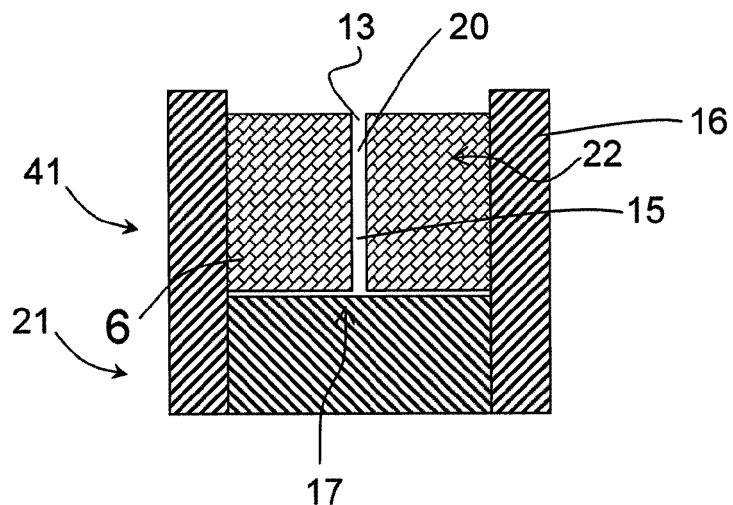

| | | | |
|---|---|---|---|
| 6,070,469 A * | 6/2000 | Taniguchi et al. | 73/720 |
| 6,076,557 A | 6/2000 | Carney | |
| 6,330,829 B1 | 12/2001 | Kurtz et al. | |
| 7,021,148 B2 | 4/2006 | Kuhn et al. | |
| 7,434,471 B2 | 10/2008 | Lukens | |
| 8,408,067 B2 | 4/2013 | Zorzetto et al. | |
| 2003/0019298 A1 | 1/2003 | Scheurich et al. | |
| 2010/0011871 A1 | 1/2010 | Bigliati et al. | |
| 2013/0233085 A1* | 9/2013 | Mizoguti et al. | 73/716 |
| 2014/0013853 A1* | 1/2014 | Wohlgemuth | 73/716 |

FOREIGN PATENT DOCUMENTS

| | | |
|---|---|---|
| DE | 102007036272 A1 | 2/2009 |
| DE | 102008026611 A1 | 12/2009 |
| DE | 202009014795 U1 | 4/2010 |
| DE | 102008043323 A1 | 5/2010 |
| WO | 9831997 A1 | 7/1998 |
| WO | 2008078184 A2 | 7/2008 |
| WO | WO-2008078184 A2 | 7/2008 |
| WO | 2010013216 A1 | 2/2010 |
| WO | WO 2013164360 A1 * | 11/2013 |

* cited by examiner

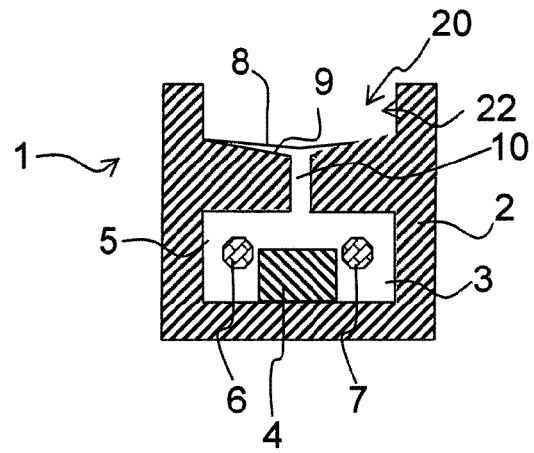
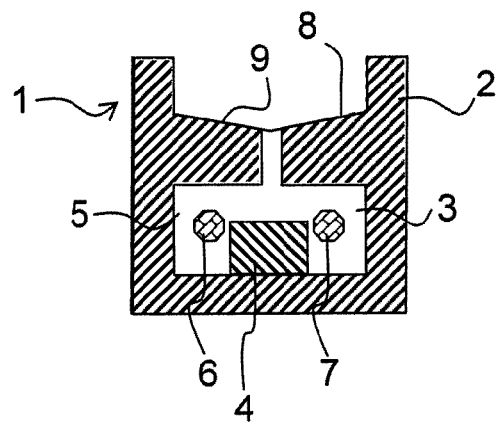
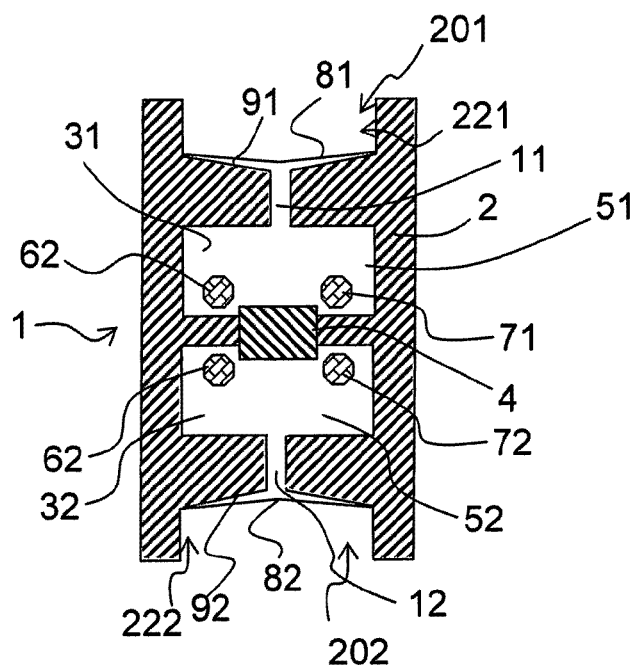

PRESSURE SENSOR HAVING A COMPRESSIBLE ELEMENT

The invention specifies a pressure sensor which is in the form for example of a differential pressure sensor, relative pressure sensor or absolute pressure sensor. The pressure sensor is preferably filled with a fluid medium, for example oil.

Differential pressure sensors are described in the documents U.S. Pat. No. 4,543,832 A and U.S. Pat. No. 4,218,925 A.

Pressure sensors in which a compressible material is provided are described in the documents DE 100 23 589 A1 and U.S. Pat. No. 5,792,958 A.

An object to be achieved is that of specifying a pressure sensor which is protected as well as possible against an overload.

In a first aspect, the invention specifies a pressure sensor which has a chamber, in particular a chamber which is closed off from the outside. Preferably, a sensor element is arranged in the chamber.

Preferably, the chamber is formed at least partially by a housing of the pressure sensor. For example, the pressure sensor is designed to measure a pressure which is applied to an outer side of the chamber. The chamber is preferably filled with a fluid medium. For example, the chamber is filled with oil. Preferably, the fluid medium is designed transmit a pressure onto a sensor element, in particular to transmit a pressure applied externally to the chamber onto a sensor element arranged in the chamber. In the following text, the fluid medium is also known as transmission medium.

Preferably, the pressure sensor is designed to measure a pressure of a further fluid medium which exerts a pressure on the outer side of the chamber. In the following text, this further fluid medium is also known as pressure medium. For example, the pressure medium exerts a pressure on a pressure-sensitive region which closes off the chamber from the outside. A pressure-sensitive region is preferably a region which reacts to pressure fluctuations and which for example deforms in the event of a pressure fluctuation.

For example, the pressure-sensitive region is in the form of a membrane, in particular a membrane which bounds or closes off the chamber. The pressure medium may in particular be such that when the pressure medium freezes, a volumetric expansion of the pressure medium occurs. For example, the pressure medium includes urea.

Furthermore, the pressure sensor has a compressible element. The compressible element serves preferably to protect the pressure sensor against an overload, in particular excess pressure. The compressible element is preferably formed such that it decreases its volume in the event of a rise in pressure. In particular, the compressibility of the compressible element may be selected such that a considerable reduction in volume occurs as soon as the pressure acting on the compressible element is above a limit pressure.

For example, such a high pressure can occur during a phase transition of a medium from a liquid to a solid phase, for example when a medium freezes. The phase transition can occur for example in the pressure medium. Alternatively or in addition, the phase transition can occur in the transmission medium. Furthermore, the limit pressure can also be exceeded without a medium freezing.

Thus, the compressible element is preferably designed such that it decreases its volume, for example when a limit pressure is exceeded. The change in volume does not have to occur during a phase transition of the medium from a liquid to a solid phase. Alternatively or in addition, the compressible element may be designed such that it decreases its volume during a phase transition of the medium from a liquid to a solid phase.

Preferably, the change in volume of the compressible element is reversible. In particular, the compressible element may include an elastic material.

The compressibility of the compressible element is preferably selected such that, if the pressure rises above the limit pressure, it is compressed to such an extent that no overloading of the pressure sensor, in particular no overloading of a sensor element arranged in the chamber, occurs. For example, the compressibility is such that a compression of the compressible element takes place during a phase transition of a medium from a liquid to a solid phase, for example when a medium freezes. Preferably, the compressible element absorbs the increase in volume of the fluid medium during the phase transition, for example during freezing. In this way, it is possible to prevent the pressure sensor, and in particular a sensor element of the pressure sensor, being damaged.

Preferably, the pressure sensor has a pressure line for supplying a pressure to be measured to an outer side of the chamber. By way of the pressure line, a pressure to be measured is guided preferably to a pressure-sensitive region. For example, the pressure line is designed to supply a pressure medium from the outside onto a membrane bounding the chamber.

In the event of a rise in the external pressure, in particular a pressure of the pressure medium, the volume of the chamber preferably decreases. For example, a deformation of a membrane which closes off the chamber from the outside occurs. On account of the decrease in volume, the pressure inside the chamber increases until the internal pressure is the same as the external pressure. Preferably, a sensor element by way of which the internal pressure and thus also the external pressure can be determined is located inside the chamber.

In one embodiment, the compressible element is arranged in the closed-off chamber.

In this case, a compression of the compressible element takes place preferably at a sufficiently high internal pressure. In the event of a compression of the compressible element, the internal pressure is lowered again. This lowering of the internal pressure with respect to the external pressure is compensated by a further decrease in the chamber volume, until the internal pressure is the same as the external pressure again.

Preferably, the compressibility of the compressible element is selected such that only slight compression of the element occurs at a nominal pressure of the pressure sensor.

Preferably, the pressure sensor is designed such that the volume of the chamber can be decreased only to a minimum volume. Correspondingly, the internal pressure prevailing in the chamber can rise only to a maximum pressure.

Preferably, the pressure sensor has a device which prevents the volume decreasing below the minimum volume.

For example, the pressure sensor has a stop for a membrane closing off the chamber. In this case, the membrane can be deformed by an external pressure acting on the membrane only until it bears against the stop. Thus, the minimum pressure in the chamber and in particular the maximum pressure prevailing in the chamber are defined by the stop. In particular, when the membrane bears against the stop, the internal pressure is independent of the external pressure and is at a predetermined maximum value.

Preferably, as a result of the compressible element, in particular when the compressible element is arranged inside the chamber, the maximum pressure is lower than in the case of a pressure sensor which is configured in the same way and has no compressible element. Thus, the pressure sensor, and in particular a sensor element arranged in the chamber, can be protected against an overload.

If the external pressure is still below the maximum pressure, an increase in the external pressure results preferably in a reduction in the volume of the chamber and thus to an increase in the internal pressure. This results in compression of the compressible element. On account of the compression of the compressible element, the internal pressure is lowered such that, on account of the external pressure applied, the volume of the chamber is decreased further. If the external pressure is higher than or the same as the maximum pressure of the pressure sensor, the volume of the chamber is decreased until the minimum volume and thus the maximum pressure in the chamber has been reached. A further decrease in volume is prevented for example by the membrane bearing against a stop. Thus, on account of the compressible element, the minimum volume of the chamber is taken up at a lower pressure. Thus, the internal pressure can rise only to a maximum value which is determined by the compressibility of the element. In the event of a further increase in the external pressure, the volume of the chamber cannot decrease further and thus the pressure in the chamber cannot rise above the maximum pressure.

In a further embodiment, the compressible element is arranged outside the closed-off chamber.

Particularly preferably, the chamber is in this case closed off from the outside by a pressure-sensitive region. Preferably, the pressure-sensitive region is in the form of a membrane, in particular a metallic membrane.

The pressure sensor preferably has a pressure line for directing the pressure of a fluid medium, in particular the pressure of a pressure medium, onto the pressure-sensitive region. The pressure line is preferably fillable with the fluid medium. The compressible element is preferably arranged on the pressure line.

With such a configuration of the pressure sensor, the pressure sensor can be protected particularly well against an overload by freezing of the pressure medium. Preferably, the compressible element absorbs a volumetric expansion of the pressure medium. In this way, in particular damage to the pressure-sensitive region, for example damage to a metallic membrane, is prevented.

In a further embodiment, compressible elements may be provided both inside and outside a chamber.

Preferably, a sensor element having a pressure-sensitive region is arranged in the chamber.

The pressure-sensitive region is designed for example such that in the event of applied pressure, deformation of the region occurs and as a result a pressure value can be determined. For example, the pressure sensor is in the form of an oil-filled piezoresistive pressure sensor. Ceramic pressure sensors having a resistive or capacitive operating principle are likewise possible.

The chamber is preferably closed off from the outside by a membrane.

The membrane separates in particular the internal region of the chamber from an external region. If a transmission medium is present in the chamber and a pressure medium is present outside the chamber, then the membrane preferably separates the media from one another. The membrane is preferably hermetically sealed. The membrane serves in particular to protect a sensor element arranged in the chamber. For example, the membrane prevents an aggressive pressure medium from coming into contact with the sensor element.

The membrane is preferably a metallic membrane. For example, the membrane includes steel, in particular stainless steel.

Preferably, a pressure medium acts from the outside on the membrane. Preferably, in the event of a rise in pressure, the membrane is deformed such that the volume in the chamber is decreased. Thus, the external pressure is transmitted into the interior of the chamber.

By way of the membrane, it is possible to prevent a medium from flowing into the chamber from the outside, and so the chamber can be protected against being overloaded by a medium flowing in. Preferably, compression of the compressible element that occurs at a nominal pressure of the pressure sensor is compensated by a deformation of the membrane, such that no distortion of the pressure measurement by the compressible element occurs.

In one embodiment, the housing of the pressure sensor has a stop for limiting the deflection of the membrane.

The stop is formed for example by one or more surfaces against which the membrane bears when a maximum permissible external pressure has been reached. In the event of a further increase in pressure, the membrane cannot deform further on account of the stop, and so the pressure in the interior of the chamber cannot rise further.

For example, the chamber has a pressure line for directing an external pressure onto a sensor element. The pressure line preferably has a smaller diameter than a region of the chamber in which the sensor element is arranged. Preferably, the membrane is located at that end of the pressure line that is remote from the chamber.

The fluid medium in the chamber is preferably an incompressible liquid, for example oil. If the pressure sensor is in the form of a differential pressure sensor, two chambers filled with a fluid medium may be provided. Preferably, the same fluid medium is located in both chambers.

For example, the pressure sensor can have only one compressible element or a plurality of compressible elements.

In one embodiment of the pressure sensor, in which the compressible elements are arranged inside the chamber, the compressible elements may be arranged in a distributed manner in the chamber. In one embodiment, the compressible element lines the inner wall of the chamber. In a further embodiment, the compressible element is formed in a spherical or approximately spherical manner. Preferably, the compressible element is in this case surrounded as completely as possible by the fluid medium. In this case, particularly uniform and rapid compression of the compressible element is possible.

In one embodiment of the pressure sensor, in which the compressible element is arranged outside the chamber, the compressible element is formed for example in a cylindrical manner. Preferably, a pressure line is formed as a feedthrough through the compressible element. Preferably, the compressible element has a shape that is producible as easily as possible, for example a shape which is producible in an extrusion process.

Preferably, the total volume in the case of a compressible element arranged inside the chamber is at least 50% of the volume of the fluid medium in the chamber.

Preferably, the compressible element is arranged as close as possible to a pressure-sensitive region of the pressure sensor. This allows particularly effective protection of the pressure sensor against damage, for example when the fluid medium freezes.

In a preferred embodiment, the distance of the compressible element from a pressure-sensitive region is less than or equal to 1000 μm, particularly preferably less than or equal to 500 μm.

In this case, the distance of the compressible element from the pressure-sensitive region is the minimum distance of the sensor element or of the pressure-sensitive region from a compressible element.

The invention furthermore specifies a pressure sensor which has two chambers which are closed off from the outside and are each filled with a fluid medium. Such a pressure sensor serves for example as a differential pressure sensor. At least one compressible element may be arranged in each chamber. As an alternative or in addition thereto, a compressible element may be arranged outside the chambers, in particular in two pressure lines.

In a further aspect, the invention specifies a sensor element for a pressure sensor.

For example, the sensor element is used in the case of a pressure sensor, in which the sensor element is arranged in an outwardly open region, for example an open pressure feed line, of the pressure sensor, such that a fluid medium can flow in and out.

The sensor element may also be used in other embodiments of pressure sensors. The sensor element is used for example in the above-described pressure sensor and is in this case arranged in the chamber of the pressure sensor.

The sensor element has a pressure-sensitive region for measuring a pressure of a fluid medium.

Preferably, the sensor element has a compressible element for protecting the sensor element against an overload. The compressible element is compressed preferably at a pressure above the nominal pressure of the sensor element such that it absorbs the pressure overload and thus protects the sensor element against damage.

Alternatively or in addition, in the event of a phase transition of the fluid medium from liquid to solid, the fluid medium is prevented from flowing in. Thus, the rise in pressure at the sensor element is effectively limited by the phase transition of the medium and the compressible element.

The compressible element may have all of the properties of the compressible element described in connection with the pressure sensor. The compressible element of the sensor element may be present in addition to further compressible elements arranged in the chamber. In one embodiment of the pressure sensor, only the sensor element has one or more compressible elements, while the chamber is free of further compressible elements.

In the following text, further configurations of the above-described pressure sensor and of the sensor element are described. The pressure sensor and/or the sensor element have a pressure-sensitive region. The pressure-sensitive region may be formed for example by a region of a sensor element, in particular by a piezoresistive membrane. Alternatively, the pressure-sensitive region may be in the form of a region which bounds a chamber, wherein a sensor element is located in the chamber. For example, in this case the pressure-sensitive region is in the form of a metallic membrane.

Preferably, the distance of the compressible element from the pressure-sensitive region is as small as possible. For example, the compressible element is spaced apart from the pressure-sensitive region to such an extent that the pressure measurement is not impeded. For example, the pressure-sensitive region is deformable, for example in the form of a membrane. In this case, a deformation of the pressure-sensitive region by the compressible element should not be impeded.

Preferably, the distance of the compressible element from the pressure-sensitive region is less than or equal to 1000 μm, particularly preferably less than or equal to 500 μm.

In one embodiment, the pressure sensor or the sensor element has a pressure line for directing the pressure of a fluid medium onto the pressure-sensitive region. The pressure line is fillable with a fluid medium and filled with the fluid medium during a pressure measurement.

Preferably, the compressible element directly adjoins the pressure line. For example, the compressible element forms the lateral boundary of the pressure line. In this case, the fluid medium in the pressure line can expand laterally in the event of freezing, wherein the compressible element is compressed and in this way overloading is prevented.

The pressure sensor or the sensor element may have a housing. In this case, the pressure line extends preferably in the housing.

Preferably, the pressure-sensitive region of the housing is connected firmly. The housing may form a support for the pressure-sensitive region. For example, the pressure-sensitive region is in the form of a membrane which is supported by the housing.

Preferably, the housing has an inner wall which is lined with the compressible element.

The compressible element fills for example the entire interior space of the housing, apart from the pressure line. The pressure line leads preferably through the compressible element.

For example, the pressure line extends vertically toward the pressure-sensitive region. In a further embodiment, the pressure line can lead at an inclination angle, for example at an angle of 45°, toward the pressure-sensitive region.

The pressure line may also have sections which have different diameters. In the case of such a pressure line, the behavior of the pressure sensor during a phase transition, for example when the medium freezes, can be set in a particularly flexible manner. As a result, the effect of a freezing medium on the pressure-sensitive region can be decreased.

For example, the total volume of all of the compressible elements of the pressure sensor or of the sensor element is at least 50% of the volume of the pressure line.

Given such a volume ratio, when the medium freezes, the resulting volume can be absorbed by compression of the compressible element.

In the following text, the subjects described here are explained in more detail with reference to schematic exemplary embodiments which are not to scale.

IN THE FIGURES

Figure 4:
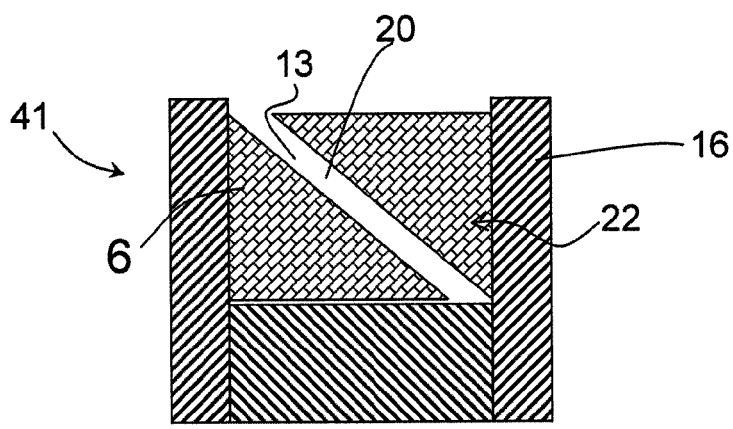
Figure 5:
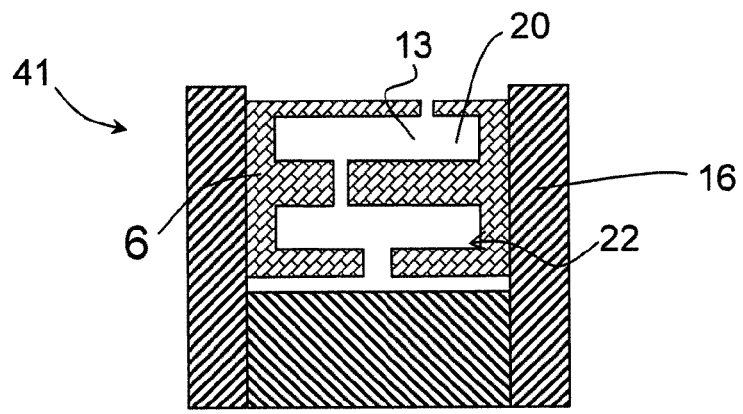
Figure 6:
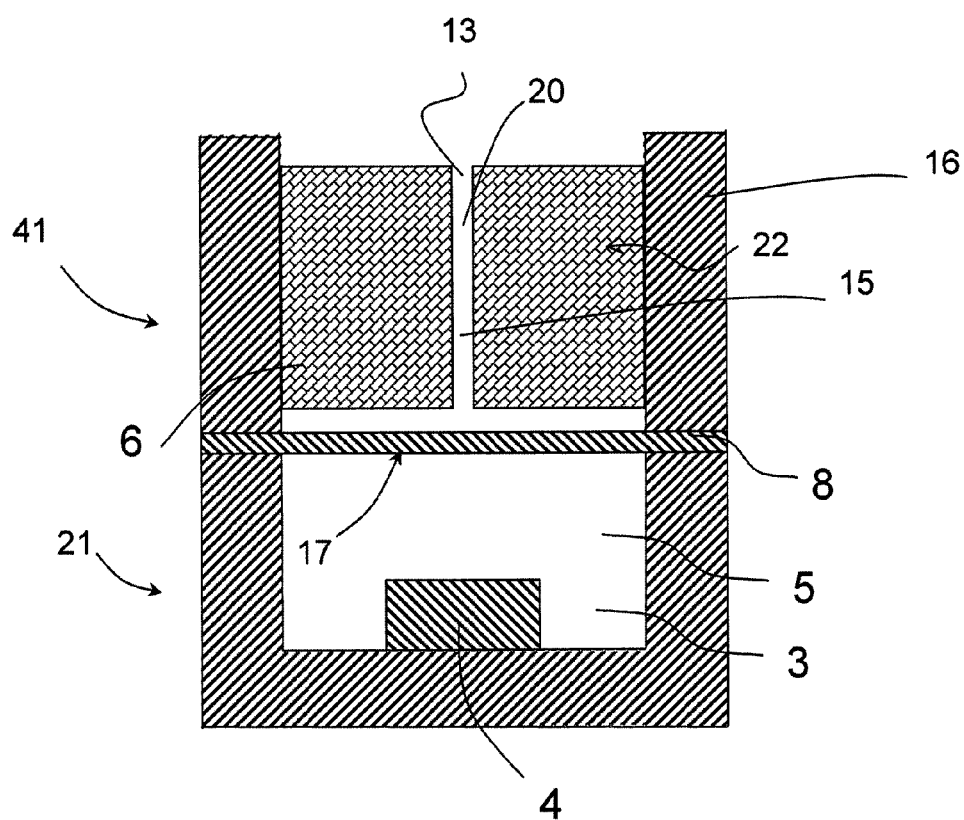

FIG. 1A shows a sectional view of a first embodiment of a pressure sensor at an external pressure less than the maximum pressure of the pressure sensor, FIG. 1B shows the pressure sensor from FIG. 1A at an external pressure greater than or equal to the maximum pressure of the pressure sensor, FIG. 2 shows a sectional view of a second embodiment of a pressure sensor, FIG. 3 shows a sectional view of a further embodiment of a pressure sensor having a compressible element, FIG. 4 shows a sectional view of a further embodiment of a pressure sensor having a compressible element, FIG. 5 shows a sectional view of a further embodiment of a pressure sensor having a compressible element, FIG. 6 shows a sectional view of a possible configuration of the pressure sensor shown in FIG. 3.

FIG. 1A shows a pressure sensor 1 which is in the form of an absolute pressure sensor. The pressure sensor 1 has a housing 2 in which a chamber 3 is formed. The chamber 3 is filled with a fluid medium 5. The fluid medium 5 is preferably an incompressible liquid, for example an oil, in particular silicone oil.

Arranged in the chamber 3 is a sensor element 4. The sensor element 4 has a piezoresistive membrane. When a force acts on the membrane, the membrane deforms, as a result of which resistances of a Wheatstone bridge change, making it possible to determine the pressure in the chamber 3. For example, the membrane is produced by removal of material from a substrate, for example by means of etching.

The chamber 3 has a pressure line 10 which is filled with the fluid medium 15. The pressure line 10 is closed off from the outside by a membrane 8 such that the chamber 3 having the pressure line 10 has a closed-off liquid volume. When an external pressure greater than the internal pressure in the chamber 3 is applied, the membrane 8 deforms and exerts a force on the fluid medium 5 in the chamber 3. The fluid medium 5 is in the form of a transmission medium which transmits the pressure to the sensor element 4. Thus, a force is exerted on the sensor element 4, by means of which the external pressure can be determined The membrane 8, which closes off the pressure line 10 from the outside, is fastened to a part of the housing 10 and arranged above a stop 9 on the housing 10. Preferably, the membrane 8 is a metallic membrane, in particular a metal membrane. The housing also has a housing passage 22, which is in the form of a pressure line. Preferably, the housing passage 22 is designed to direct a pressure medium 20 from outside onto the membrane 8. Preferably, the pressure sensor 1 serves to determine the pressure of the pressure medium 20.

In the case of an external pressure which is lower than the maximum pressure of the pressure sensor 1, the membrane 8 is spaced apart from the stop 9 and can deform in the direction of the pressure line 10. FIG. 1A shows the pressure sensor 1 at such an external pressure.

If the external pressure exceeds the maximum pressure of the pressure sensor 1, the membrane 8 deforms in the direction of the stop 9 until it bears against the stop 9, as is shown in FIG. 1B. If the external pressure increases further, the membrane 8 cannot deform further. In this way, damage to the membrane 8 by excessive deformation and an excessive rise in pressure in the pressure line 10 and the chamber 3 is prevented. In addition, a minimum volume of the chamber 3 and thus a maximum pressure in the chamber 3 are defined by the stop 9. Thus, damage to the pressure sensor 1 and in particular to the sensor element 4 at an external pressure greater than the maximum pressure is prevented.

As a result of the arrangement of the compressible elements 6, 7 inside the chamber 3, the maximum pressure inside the chamber 3 is decreased compared with a pressure sensor which does not have the compressible elements 6, 7. In this way, damage to the sensor element 4 can be prevented.

In a further embodiment, the pressure sensor 1 can be designed such that damage caused by an increase in pressure in the pressure chamber 3, for example when the fluid medium 15 freezes, is prevented by the compressible elements 6, 7.

The compressibility of the compressible elements 6, 7, i.e. the change in the volume of the elements 6, 7 per pressure change, is greater than the compressibility of the fluid medium 3. In particular, the compressibility of the compressible elements 6, 7 is such that the compressible elements are compressed in the event of a rise in pressure in the chamber 3 and decrease their volume. In this way, excess pressure in the chamber 3 is prevented. For example, the compressibility of the material of the compressible elements 6, 7 lies at Shore A values of between 5 and 50.

FIG. 1B shows the pressure sensor 1 in a state in which the external pressure is greater than or equal to the maximum pressure of the pressure sensor 1. The compressible elements 6, 7 have a reduced volume compared with FIG. 1A, in which the external pressure is lower than the maximum pressure. The membrane 8 bears against the stop 9 such that the volume of the chamber 3 cannot be reduced further. Thus, the internal pressure in the chamber 3 is equal to the maximum pressure. Even in the event of an increase in the external pressure, the internal pressure does not rise further. Thus, when the membrane 8 bears against the stop 9, the internal pressure is decoupled from the external pressure.

The compressible elements 6, 7 are formed for example from a foam-like or rubber-like material. The compressible elements 6, 7 are formed for example in a spherical manner or have for example a shape having planar external surfaces, which approaches a spherical shape, for example the shape of a dodecahedron. The compressible elements 6, 7 are preferably completely surrounded by the fluid medium 15.

In this case, in the event of a rise in pressure, a force acts from all sides on the compressible elements 6, 7, such that particularly rapid and uniform compression can occur.

In further embodiments, differently shaped compressible elements 6, 7, for example compressible elements which line the wall region of the chamber 3, may be arranged in the chamber 3. The number of compressible elements may also vary, for example only one compressible element or more than two compressible elements may be arranged in the chamber 3.

FIG. 2 shows a further embodiment of a pressure sensor 1, wherein the pressure sensor 1 is in the form of a differential pressure sensor. The pressure sensor 1 has two chambers 31, 32 which are each filled with a fluid medium 51, 52. Arranged in each chamber are compressible elements 61, 71 and 62, 72, respectively, which protect the pressure sensor 1 against excess pressure. Arranged between the chambers 31, 32 is a sensor element 4 which measures the pressure difference between the chambers 31, 32. The chambers 31, 32 each have a pressure line 11, 12 which leads to a membrane 81, 82 which is acted upon by an external pressure. The external pressure is exerted in each case by a pressure medium 201, 202, which is guided from outside onto the membrane 81, 82 through a housing passage 221, 222. The differential pressure sensor 4 thus measures the difference between the external pressures, in particular the difference between the pressures present in the pressure media 201, 202.

In terms of its details, the pressure sensor 1 may be designed in a manner corresponding to the pressure sensor 1 shown in FIGS. 1A and 1B.

FIGS. 3, 4 and 5 show further embodiments of a pressure sensor 41 having a compressible element 6. The compressible element 6 is arranged preferably as close as possible to a pressure-sensitive region 17 of a sensor region 21 of the pressure sensor 41.

The pressure sensor 41 may be designed for example in a similar manner to the pressure sensors 1 shown in FIGS. 1A, 1B and 2. In particular, the sensor region 21 may be formed like the chamber 3 in FIG. 1A and the pressure-sensitive region may correspond to the membrane 8 from FIG. 1A. This embodiment is described in detail in FIG. 6.

As an alternative thereto, the sensor region 21 may be designed for example like the sensor element 4 from FIG. 1A. The pressure-sensitive region 17 is in this case formed for example as a piezoresistive membrane of the sensor element 4. The compressible element 6 is arranged preferably as close as possible to the pressure-sensitive region 17 of the pressure sensor 41, such that it does not impede the deformation of the pressure-sensitive region 17 in the event of applied pressure.

The pressure sensor 41 has a sensor housing 16 which forms a housing passage 22. The housing passage 22 is in the form of a tubular section, at one end of which the pressure-sensitive region 17 of the pressure sensor 41 is located. The housing passage 22 allows in particular a fluid medium 15 to be supplied to the pressure-sensitive region 17.

The inner walls of the housing 16 are lined with the compressible element 6. In this way, a pressure line 13 which has a narrower cross section compared with the housing passage 22 bounded by the housing 16 is formed. The pressure line 13 extends at least partially through the compressible element 6. In particular, the compressible element 6 is designed such that the region of the pressure line 13 which has the smallest diameter is bounded by the compressible element 6. The pressure line 13 has in particular no constriction which is bounded by the housing 16.

Preferably, the compressible element 6 has a shape which is as easy to produce as possible. For example, the compressible element 6 has a shape which is translationally invariant in one direction, for example a cylindrical shape. Such a compressible element 6 may be produced for example in an extrusion process. In particular, in an extrusion process a strip can first be formed which is then divided into a plurality of compressible elements 6.

The housing 16 is for example in the form of a support on which a pressure-sensitive region 17 configured as a membrane rests. Preferably, the membrane is a metallic membrane. The membrane can be held at its lateral ends by the housing 16.

In an alternative embodiment, the membrane is for example a silicon membrane. For example, the membrane is formed by etching away material from the carrier substrate. For example, the region inside the housing, in which the pressure line 13 and the compressible element 6 are arranged, is formed by removal of material during the production of the membrane. For example, the membrane is formed in one piece with the housing 16.

In FIG. 3, the pressure line 13 extends vertically toward the pressure-sensitive region 17 of the pressure sensor 41.

During the pressure measurement, the pressure line 13 is filled with a fluid medium 15. For example, the fluid medium 15 is a pressure medium, the pressure of which is intended to be determined by the pressure sensor 41. In particular, the fluid medium 15 may be formed like the medium 20 from FIG. 1A. Alternatively, the fluid medium 15 may be in the form of a transmission medium which transmits an external pressure onto a sensor element. In this case, the fluid medium 15 is formed for example like the medium 5 from FIG. 1A.

In the event of the fluid medium 15 freezing in the pressure line 13, the volume of the compressible element 6 is decreased such that an increase in the volume of the fluid medium 15 is compensated by a reduction in the volume of the compressible element 15. In this way, the pressure-sensitive region 17 is protected against excess pressure.

FIG. 4 shows a further embodiment of a pressure sensor 41 having a compressible element 6 arranged preferably as close as possible to the pressure-sensitive region 17. In this embodiment, the pressure line 13 extends diagonally in the housing 16 and at an inclination angle, in this case about 45°, to the pressure-sensitive region 17.

FIG. 5 shows a further embodiment of a pressure sensor 41 having a compressible element 6 arranged preferably as close as possible to the pressure-sensitive region 17. In this embodiment, the pressure line 13 has sections 18, 19 with different diameters.

FIG. 6 shows a possible embodiment of the pressure sensor 41 from FIG. 3 in detail. The sensor region 21 is in the form of a closed-off chamber 3 which is filled with a fluid medium 5, in particular oil. The chamber 3 is bounded by a membrane 8. The membrane 8 is preferably a metallic membrane. A pressure acting on the membrane 8 results in a deformation of the membrane 8 and thus a decrease in the volume of the chamber. Preferably, the membrane 8 is designed such that locally arising pressure peaks are averaged. Thus, pressure peaks in the chamber 3 are avoided and damage to a sensor element 4 arranged in the chamber 3 is prevented.

As a result of the compressible element 6, the membrane 17 is protected against an overload. In particular, when the pressure medium 20 freezes, the compressible element 6 prevents damage to the membrane 17 occurring as a result of a volumetric expansion of the pressure medium 20.

The compressible element 6 is designed such that, when the fluid medium 15 located in the pressure line 13 freezes, damage to the membrane 8 is prevented.

LIST OF REFERENCE SIGNS

1 Pressure sensor
2 Housing
3 Chamber
31, 32 Chambers
4 Sensor element
41 Pressure sensor
5 Medium
51, 52 Fluid media
6, 7 Compressible element
61, 62, 71, 72 Compressible elements
8 Membrane
81, 82 Membranes
9 Stop
91, 92 Stops
10 Pressure line
11, 12, 13 Pressure lines
15 Fluid medium
16 Housing of the sensor element
17 Pressure-sensitive region
18, 19 Sections
20 Pressure medium
201, 202 Pressure media
21 Sensor region
22 Housing passage
221, 222 Housing passages

The invention claimed is:

1. A pressure sensor, comprising:
a chamber in which a sensor element for measuring a pressure is arranged; and
a compressible element for protecting against excess pressure,
wherein the compressible element is arranged outside the chamber,
wherein the compressible element is at least partially surrounded by a fluid medium,
wherein the compressible element is adapted to decrease its volume when the pressure in the fluid medium rises above a limit pressure, and
wherein the volume is taken up by the fluid medium, leading to a decrease of pressure in the fluid medium.

2. The pressure sensor according to claim 1, wherein the chamber is bounded by a pressure-sensitive region.

3. The pressure sensor according to claim 1 or 2, further comprising:
a pressure line, which is fillable with the fluid medium, for directing the pressure of the medium onto the pressure-sensitive region,
wherein the compressible element is arranged on the pressure line.

4. The pressure sensor according to claim 1, wherein the pressure-sensitive region is in the form of a membrane.

5. The pressure sensor according to claim 4, wherein the membrane is a metallic membrane.

6. The pressure sensor according to claim 1, further comprising:
a housing,
wherein the pressure line extends in the housing.

7. The pressure sensor according to claim 6, wherein the housing has an inner wall which is lined with the compressible element.

8. The pressure sensor according to claim 1, wherein the pressure line leads through the compressible element.

9. The pressure sensor according to claim 1, wherein the pressure line extends vertically toward the pressure-sensitive region.

10. The pressure sensor according to claim 1, wherein the pressure line extends at an inclination angle toward the pressure-sensitive region.

11. The pressure sensor according to claim 1, wherein the pressure line has sections which have different diameters.

12. The pressure sensor according to claim 11, wherein the section having the smallest diameter is bounded by the compressible element.

13. The pressure sensor according to claim 1, wherein the total volume of the compressible elements is at least 50% of the volume of the pressure line.

14. The pressure sensor according to claim 1, wherein the distance of the compressible element from the pressure-sensitive region is less than or equal to 1000 μm.

15. The pressure sensor according to claim 1, wherein the chamber is oil-filled.

16. The pressure sensor according to claim 1, wherein the compressible element is formed from a foam-like or rubber-like material.

17. The pressure sensor according to claim 1, wherein the chamber is closed by a membrane and the compressible element is located on a different side of the membrane than the sensor element.

* * * * *